United States Patent
Yoshida

(10) Patent No.: US 6,373,853 B1
(45) Date of Patent: Apr. 16, 2002

(54) DYNAMIC ATM ADDRESS MAPPING SYSTEM AND DYNAMIC ADDRESS MAPPING METHOD IN OSI COMMUNICATION ENVIRONMENT VIA ATM-SVC NETWORK

(75) Inventor: Atsumasa Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/169,133

(22) Filed: Oct. 9, 1998

(30) Foreign Application Priority Data

Oct. 9, 1997 (JP) .............................................. 9-293536

(51) Int. Cl.$^7$ .............................................. H04L 12/66
(52) U.S. Cl. .................. 370/465; 370/466; 370/395.54; 709/203
(58) Field of Search ................................. 370/465, 466, 370/467, 395.1, 398, 399, 395.2, 395.5, 395.52, 395.53, 395.54, 395.56; 709/203, 220, 222, 227

(56) References Cited

U.S. PATENT DOCUMENTS

| 5,774,662 | A | * | 4/1998 | Sakagawa .................... 709/203 |
| 5,809,233 | A | * | 9/1998 | Shur ....................... 370/395.54 |
| 5,822,320 | A | * | 10/1998 | Horikawa et al. ........... 370/396 |
| 5,909,446 | A | * | 6/1999 | Horikawa et al. ........... 370/396 |
| 5,982,773 | A | * | 11/1999 | Nishimura et al. ..... 370/395.53 |

FOREIGN PATENT DOCUMENTS

| JP | 9-130391 | | 5/1997 |
| JP | 9-139742 | | 5/1997 |
| WO | WO 96/06492 | * | 2/1996 |

OTHER PUBLICATIONS

Giordano et al, IP and ATM—a position paper, Swiss Federal Institute of Technology Lausanne, pp. 1–45, Jul. 1997.*
Perez et al, ATM Signaling Support for IP over ATM, IETF, RFC 1755, pp. 1–32, Feb. 1995.*
Laubach, Classical IP and ARP over ATM, IETF, RFC 1577, pp. 1–17, Jan. 1993.*
Chao et al, IP on ATM Local Area Networks, IEEE, pp. 1–15, Jun. 6, 1994.*
Shimizu Yohito, "ATM–LAN", 1995, pp. 156–164.

* cited by examiner

*Primary Examiner*—Wellington Chin
*Assistant Examiner*—Frank Duong
(74) *Attorney, Agent, or Firm*—Sughrue Mion, PLLC

(57) ABSTRACT

A dynamic ATM address mapping system in an OSI communication environment via an ATM-SVC network, wherein an ATM address server for registering and controlling address information of pair of ATM address and network address on each end system and relay system of a logical sub-network is provided within the logical sub-network, each of the end system and relay system within the logical sub-network comprising address information registration requesting unit for requesting the ATM address server to register the address information of the own ATM address and network address in pair, and address acquiring unit for receiving an ATM address of a communication party from the ATM address server and registering the ATM address, the ATM address server comprising address registering unit for registering the address information of the ATM address and network address in pair, upon receipt of the address information registration request from the end system and relay system, and address notifying unit for notifying an ATM address of a communication party required by the end system and relay system, to the end system and relay system.

13 Claims, 3 Drawing Sheets

DYNAMIC ATM ADDRESS MAPPING SYSTEM AND DYNAMIC ADDRESS MAPPING METHOD IN OSI COMMUNICATION ENVIRONMENT VIA ATM-SVC NETWORK

BACKGROUNDS OF THE INVENTION

1. Field of the Invention

The present invention relates to an ATM address mapping system in the OSI (open system interconnection) communication environment, and more particularly to an ATM dynamic address mapping system capable of dynamically mapping ATM addresses and NSAP addresses.

2. Description of the Related Art

Conventional means of dynamically mapping (address resolution) ATM addresses and network addresses (IP addresses) in the TCP/IP communication environment via an ATM-SVC network, is described in, for example, RFC1577.

The OSI communication environment through the ATM-SVC network, however, is not provided with means of dynamically mapping ATM addresses and network addresses (NSAP addresses).

Therefore, since only a statistic address resolution is possible in the OSI communication environment via the ATM-SVC network, an initialization work has been performed for previously defining a mapping table of ATM addresses and NSAP addresses in each end system or each relay system (router) within a network, prior to the system operation. The mapping table once set up in this way cannot be relieved until the end of the system operation.

As mentioned above, since it cannot help resolving addresses statistically in the conventional OSI communication environment via the ATM-SVC network, it has such a defect that an initialization work is required for previously defining a mapping table of ATM addresses and NSAP addresses in each end system or each relay system (router) within a network prior to the system operation.

Since the mapping table cannot be relieved until the end of the system operation, it has such a defect that the address information on an end system or a relay system of the other party having finished communication cannot be relieved also until the end of the system operation, thereby reducing memory use efficiency.

SUMMARY OF THE INVENTION

A first object of the present invention is to provide an ATM dynamic address mapping system and method capable of dynamically mapping ATM addresses and NSAP addresses (address resolution), in the OSI communication environment via the ATM-SVC network.

second object of the present invention is to provide an ATM dynamic address mapping system and method which can eliminate an initialization work for previously defining a mapping table of ATM addresses and NSAP addresses in each end system or each relay system (router) within a network, prior to the system operation.

A third object of the present invention is to provide an ATM dynamic address mapping system and method capable of relieving address information after finishing communication and therefore improving memory use efficiency, compared with the conventional method incapable of relieving address information on an end system or a relay system of the other party having finished communication until the end of the system operation.

According to the first aspect of the invention, a dynamic ATM address mapping system in an OSI communication environment via an ATM-SVC network, wherein an ATM address server for registering and controlling address information of pair of ATM address and network address on each end system and relay system of a logical sub-network is provided within the logical sub-network, each of the end system and relay system within the logical sub-network comprising address information registration requesting means for requesting the ATM address server to register the address information of the own ATM address and network address in pair, and address acquiring means for receiving an ATM address of a communication party from the ATM address server and registering the ATM address, the ATM address server comprising address registering means for registering the address information of the ATM address and network address in pair, upon receipt of the address information registration request from the end system and relay system, and address notifying means for notifying an ATM address of a communication party required by the end system and relay system to the end system and relay system.

In the preferred construction, the ATM address server further comprises an address correspondence table for registering the address information of each pair of ATM address and network address on each of the end system and relay system, said address registering means of the ATM address server registering the address information of the ATM address and network address in pair into said address correspondence table, according to an address information registration request from an end system and relay system, said address notifying means of the ATM address server receiving an ATM address of a communication party required by an end system and a relay system from said address correspondence table and notifying the ATM address, while each of the end system and relay system within the logical sub-network further comprises an address correspondence table for registering the ATM address of the communication party received from the ATM address server by said address acquiring means.

In another preferred construction, each of the end system and relay system further comprises address information refresh means for deleting address entry on a corresponding end system or relay system of a communication party from said own address correspondence table, after finishing the communication with the end system of the communication party.

In another preferred construction, the ATM address server further comprises address registration completion notifying means for sending a registration completion notice of the address information to the end system and relay system, while the end system and relay system further comprises address information registration completing means for receiving the registration completion notice of the address information from the ATM address server and recognizing the address information registration completion.

In another preferred construction, the end system and relay system further comprises address information refresh means for deleting address entry on a corresponding end system or relay system of a communication party from said own address correspondence table, at a predetermined elapsed time without communication after finishing the communication with the end system of the communication party.

In another preferred construction, the end system and relay system further comprises address query means for requesting the ATM address server to refer to an ATM address of a communication party, when receiving no ATM address information of the communication party, while the ATM address server further comprises address retrieval means for receiving the address query request from the end system and relay system and retrieving the corresponding ATM address from said own address correspondence table for a specified network address as a key According to the second aspect of the invention, a dynamic ATM address mapping system in an communication environment via an ATM-SVC network, wherein an ATM address server for registering address information of pair of ATM address and network address on each end system and relay system of a logical sub-network into an address correspondence table and controlling the address information, is provided within the logical sub-network, the ATM address server comprising address registering means for registering the address information of the ATM address and network address in pair into the own address correspondence table, according to a registration request of the address information of pair of the own ATM address and network address from the end system and relay system, address retrieval means for retrieving the corresponding ATM address from said own address correspondence table for a specified network address as a key, according to the ATM address query request of a communication party from the end system and relay system, and address notifying means for notifying the ATM address obtained as a result of the retrieval to the end system and relay system.

In the preferred construction, the ATM address server further comprises address registration completion notifying means for sending a registration completion notice of the address information to the end system and relay system.

According to the third aspect of the invention, a dynamic ATM address mapping method in an OSI communication environment via an ATM-SVC network, wherein an ATM address server for registering address information of each pair of ATM address and network address on each end system and relay system of a logical sub-network into an address correspondence table and controlling the address information, is provided within the logical sub-network, said method comprising the steps of:

in each of the end system and relay system within the logical sub-network, requesting the ATM address server to register the address information of the own ATM address and network address in pair; and receiving an ATM address of a communication party from the ATM address server and registering the ATM address into the address correspondence table; while in the ATM address server, registering the address information of the ATM address and network address in pair into the address correspondence table, upon receipt of the address information registration request from the end system and relay system; and receiving an ATM address of a communication party required by the end system and relay system from the address correspondence table and notifying the ATM address to the end system and relay system.

In the preferred construction, a dynamic ATM address mapping method comprising the step of:

in the end system and relay system, deleting address entry on a corresponding end system or relay system of a communication party from the own address correspondence table, after finishing the communication with the end system of the communication party.

In another preferred construction, a dynamic ATM address mapping method comprising the step of:

in the ATM address server, sending a registration completion notice of the address information to the end system and relay system; and in the end system and relay system, receiving the registration completion notice of the address information from the ATM address server and recognizing the address information registration completion.

In another preferred construction, a dynamic ATM address mapping method comprising the step of:

in the end system and relay system, deleting address entry on a corresponding end system or relay system of a communication party from the own address correspondence table, at a predetermined elapsed time without communication after finishing the communication with the end system of the communication party.

In another preferred construction, a dynamic ATM address mapping method comprising the step of:

in the end system and relay system, requesting the ATM address server to refer to an ATM address of a communication party, when receiving no ATM address information of the communication party; and in the ATM address server, receiving the address query request from the end system and relay system and retrieving a corresponding ATM address from the own address correspondence table for a specified network address as a key.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
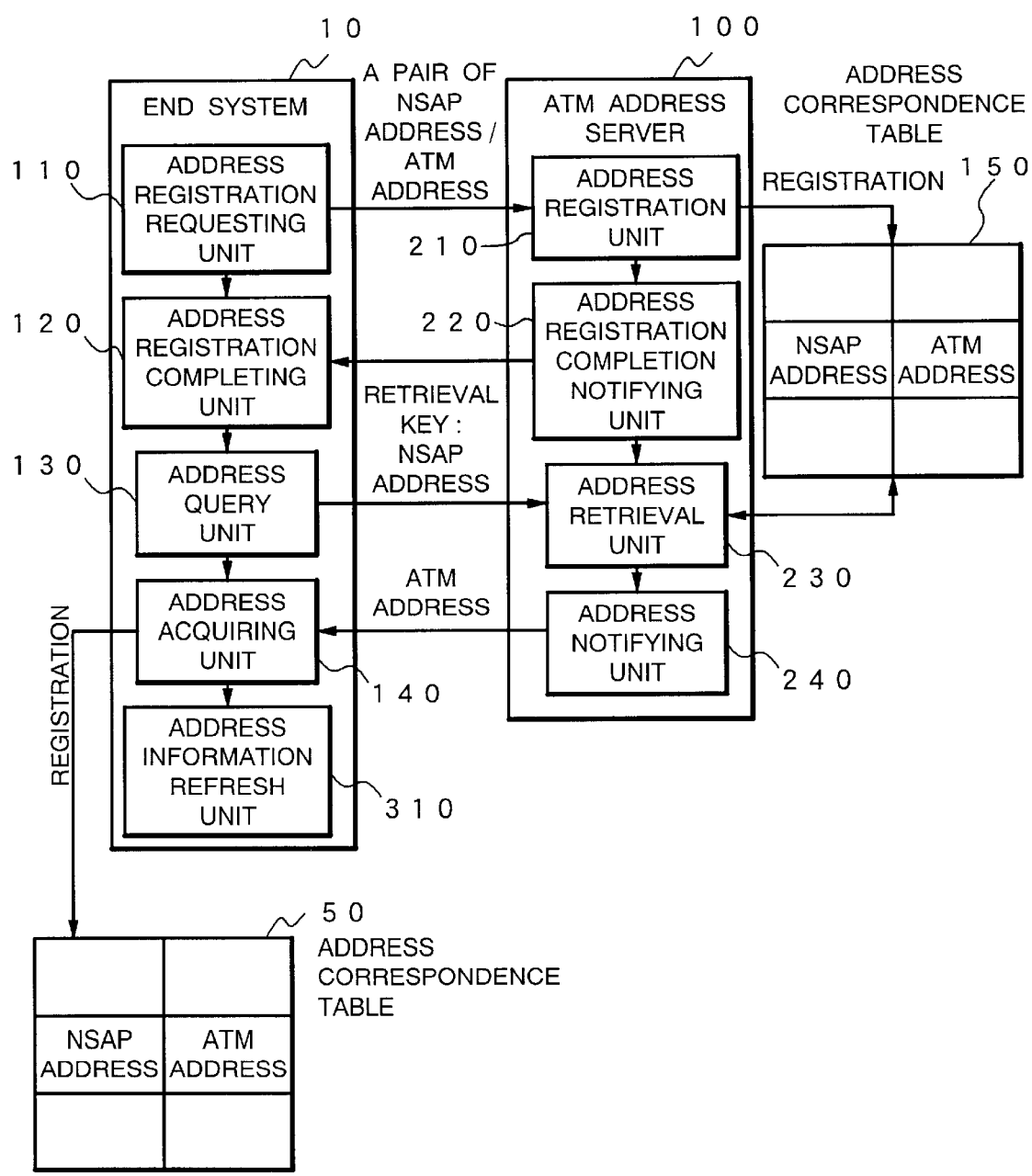
FIG. 1 is a block diagram showing the structure of an end system and an ATM address server according to an embodiment of the present invention.
Figure 2:
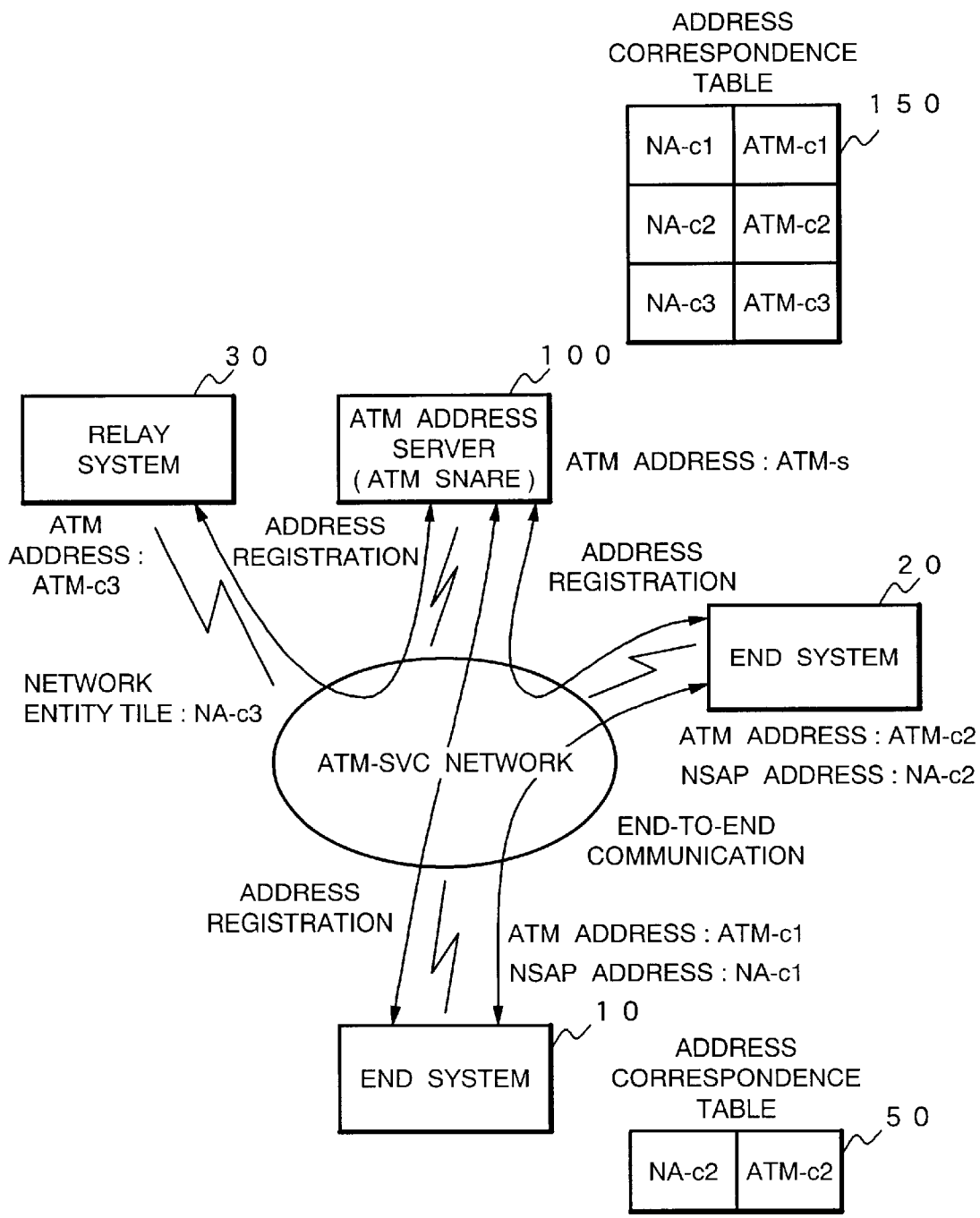
FIG. 2 is a structural view of a network system according to the embodiment of the present invention.
Figure 3:
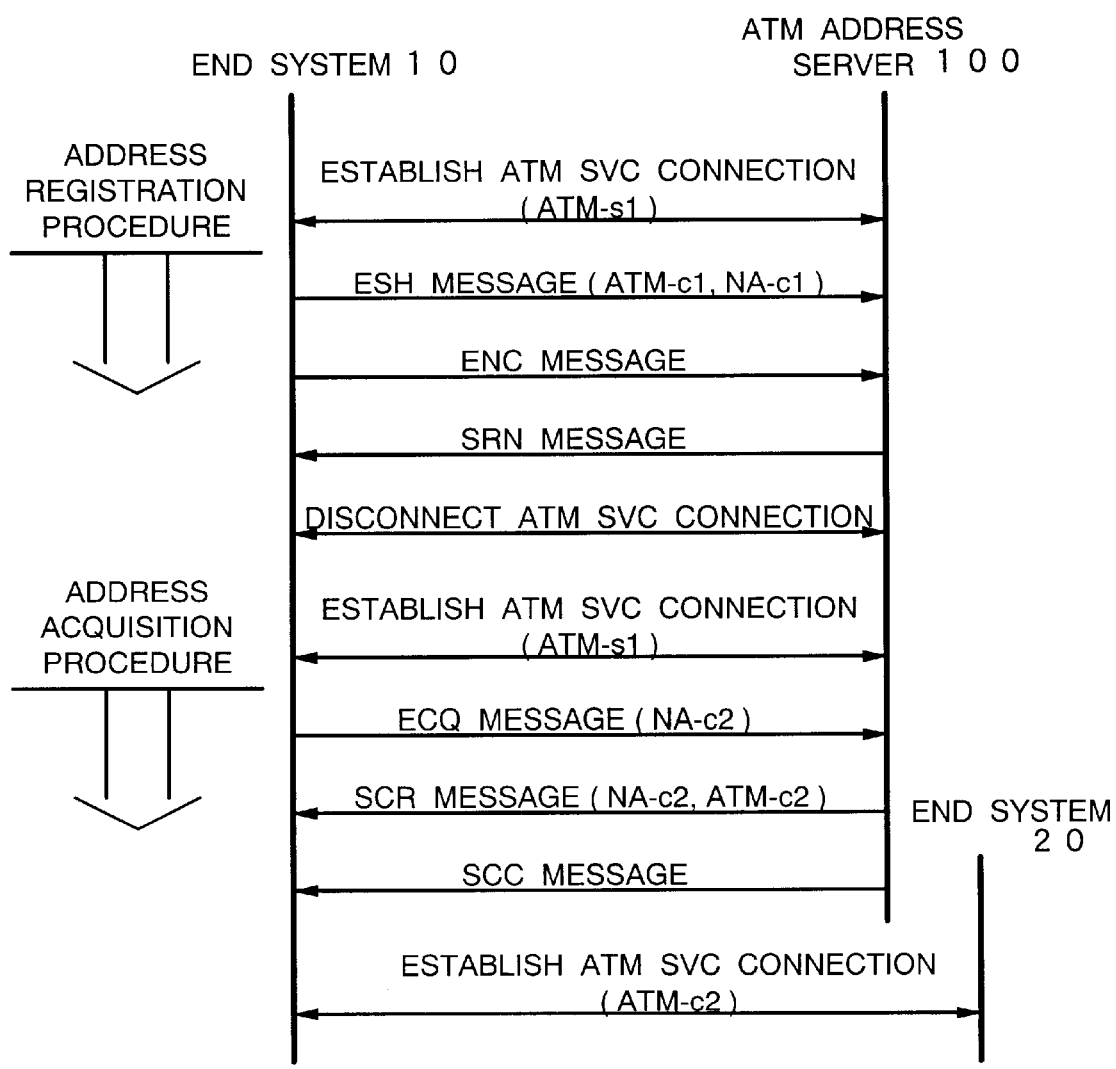
FIG. 3 is a sequence view for use in describing the operation of the embodiment of the present invention.

FIG. 1 is a block diagram showing the structure of an end system and an ATM address server in the OSI communication environment via the ATM-SVC network according to the present invention, FIG. 2 is a structural view of a network system in the OSI communication environment via the ATM-SVC network according to the present invention, and FIG. 3 is a sequence view for use in describing the operation of the embodiment of the present invention.

With reference to FIG. 2, an ATM address server 100 is provided within a logical sub-network, in a network system according to the embodiment of the present invention. The ATM address server 100 is a server for controlling a correspondence table 150 of ATM addresses or NSAP addresses of each end system or each relay system within the logical sub-network. Assume that the ATM address of the ATM address server 100 has been previously notified to each end system 10 or each relay system 30 prior to the system operation.

Further, assume that default Network Entity Title within a logical sub-network has been previously notified to each end system prior to the system operation.

As illustrated in FIG. 1, the end system 10 (or the relay system 30) is provided with an address registration requesting unit 110, an address registration completing unit 120, an address query unit 130, an address acquiring unit 140, and an address information refresh unit 310.

The address registration requesting unit 110 requests the ATM address server 100 within the same logical sub-network to register the address information of the own ATM address and network address (NSAP address or Network Entity Title) in pair.

The address registration completing unit 120 receives a registration completion notice of the above address information from the ATM address server 100 and recognizes that the address information registration has been completed. The address query unit 130 refers to the ATM address server 100 for the ATM address of a communication party when receiving no ATM address information of the communication party.

The address acquiring unit 140 receives the above ATM address of the communication party from the ATM address server 100 and registers it into the own address correspondence table 50. The address information refresh unit 310 deletes the address entry relative to a corresponding end system (or relay system) from the own address corresponding table 50 at the time-out of a predetermined elapsed hour, after finishing the communication.

The ATM address server 100 is provided with an address registration unit 210, an address registration completion notifying unit 220, an address retrieval unit 230, and an address notifying unit 240.

Based on an address registration request from an end system (or relay system) within the same logical sub-network, the address registration unit 210 registers the corresponding address information of the own ATM address and NSAP address (or Network Entity Title) in pair, into the own address correspondence table 150. The address registration completion notifying unit 220 sends a notice of completing address registration into the above address correspondence table 150, to the end system (or relay system) having issued the address registration request.

Based on an address query request from an end system (or relay system) within the same logical sub-network, the address retrieval unit 230 retrieves the own address correspondence table 150 for a specified NSAP address as a key. The address notifying unit 240 notifies the ATM address obtained by the retrieval to the end system (or relay system) having issued the address query request.

This time, the operation of the embodiment of the present invention will be described in detail with reference to FIGS. 1 and 3.

Each end system 10, 20 (or relay system 30) within a logical sub-network calls the ATM address server 100 at boot-up of a system so to establish an ATM-SVC connection. Thereafter, the address registration requesting unit 110 sends an ESH (ES Hello) message (or ISH (IS Hello) message) to the ATM address server 100 on a U-plane, by use of a multi protocol encapsulation transmission method on AAL, thereby executing an address registration request. The address information of the own ATM address and an NSAP address (or Network Entity Title) in pair is set up in this ESH message (or ISH message).

The ATM address server 100, upon receipt of the ESH message, registers the address information of the ATM address and NSAP address (or Network Entity Title) in pair into the correspondence table 150, based on the address information within the ESH message (or ISH message).

The end system 10, 20 (or relay system 30) notifies the notice completion of the structure information to the ATM address server 100, by the transmission of an ENC message (or INC message), after sending the ESH message (or ISH message). In reply to the ENC (ES Notification Complete) message (or INC (IS notification Complete) message), the address registration completing unit 120 receives an SRN (SNARE Received Notification) message from the address registration completion notifying unit 220 of the ATM address server 100, thereby to recognize the completion of the address registration. After the completion of the registration procedure, the SVC connection to the ATM address server 100 will be relieved.

When receiving no ATM address information of a communication party, each end system 10, 20 (or relay system 30) calls the ATM address server 100 to establish an ATM-SVC connection between the ATM address server 100 and itself.

Thereafter, the address query unit 130 executes an address query request, by sending an ECQ (ES Configuration Query) message (or ICQ message) to the ATM address server 100 on a U-pane. The NSAP address of a communication party whose ATM address is wanted is set up in the ECQ message (or ICQ (IS Configuration Query) message).

In the ATM address server 100, the address retrieval unit 230 retrieves the address correspondence table 150 for an NSAP address specified within the ECQ message (or ICQ message) as a target key. The address notifying unit 240 sets up the ATM address of the address query requested communication party found as a result of the retrieval, on the SCR (SNARE (SubNetwork Address Resolution Entity) Configuration Response) message, and returns the same to the end system 10, 20 (or relay system 30).

The completion of the structure information response is notified to the end system 10, 20 (or relay system 30), by sending the SCC (SNARE Configuration Complete) message.

The address acquiring unit 140 of the end system 10, 20 (or relay system 30) receives the SCC message from the ATM address server 100 and registers the corresponding address information of the NSAP address and ATM address in pair set up on the SCR message into the own address correspondence table 150. Thus, address mapping (resolution) has been completed.

The end system 10 (or relay system 30) calls the communication party with the ATM address after acquiring the ATM address of the communication party.

The information of the obtained pair of the ATM address and NSAP address is once registered into the address correspondence table 50 on the end system 10, 20 (or relay system 30) and after finishing the communication, the corresponding address information will be deleted from the address correspondence table 50 by the address information refresh unit 310 at the time-out of a predetermined elapsed hour without any communication. When communication is retried again within a predetermined hour, the address information will be never deleted from the address correspondence table 50. In this case, a predetermined elapsed hour will be counted again after the completion of the communication.

The dynamic ATM address mapping system of the embodiment can be realized by loading into a memory of a computer processor, a processing program including an address information registration requesting function and an address acquiring function of an end system or a relay system, and an address registering function and an address notifying function of an ATM address server. This processing program is stored in a storing medium such as a magnetic disk, a semiconductor memory, or the like. The above respective functions can be realized by loading the program into a computer processor from the storing medium, thereby to control the operation of the computer processor.

As set forth herein above, the ATM dynamic address mapping system of the present invention enables dynamic mapping (address resolution) of an ATM address and a network address in the OSI communication environment via the ATM-SVC network. Therefore, it can eliminate an initialization work, for address resolution, such as previously defining a mapping table of an ATM address and a network address, in each end system or each relay system (router) within a logical sub-network, prior to the system operation.

The information of the obtained pair of ATM address and network address is once registered in an end system or a relay system, and after finishing communication, the address information is relieved at the time-out of a predetermined elapsed hour. Therefore, except for the case of frequent communication with a specified party, the ATM dynamic address mapping system of the present invention can relieve address information after completion of communication, thereby improving memory use efficiency, compared with the conventional method incapable of relieving the address information on an end system or a relay system of a communication party having finished communication until the end of the system operation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A dynamic ATM address mapping system in an OSI communication environment via an ATM-SVC network, wherein
   an ATM address server for registering and controlling address information of pair of ATM address and network address on each end system and relay system of a logical sub-network is provided within the logical sub-network,
   each of the end system and relay system within the logical sub-network comprising
      address information registration requesting means for requesting the ATM address server to register the address information of the own ATM address and network address in pair, and
      address acquiring means for receiving an ATM address of a communication party from the ATM address server and registering the ATM address,
   the ATM address server comprising
      address registering means for registering the address information of the ATM address and network address in pair, upon receipt of the address information registration request from the end system and relay system, and
      address notifying means for notifying an ATM address of a communication party required by the end system and relay system to the end system and relay system.

2. A dynamic ATM address mapping system as set forth in claim 1, wherein
   the ATM address server further comprising
      an address correspondence table for registering the address information of each pair of ATM address and network address on each of the end system and relay system,
      said address registering means of the ATM address server registering the address information of the ATM address and network address in pair into said address correspondence table, according to an address information registration request from an end system and a relay system,
      said address notifying means of the ATM address server receiving an ATM address of a communication party required by an end system and a relay system from said address correspondence table and notifying the ATM address, while
   each of the end system and relay system within the logical sub-network further comprising
      an address correspondence table for registering the ATM address of the communication party received from the ATM address server by said address acquiring means.

3. A dynamic ATM address mapping system as set forth in claim 2, wherein
   each of the end system and relay system further comprising
      address information refresh means for deleting address entry on a corresponding end system or relay system of a communication party from said own address correspondence table, after finishing the communication with the end system of the communication party.

4. A dynamic ATM address mapping system as set forth in claim 1, wherein
   the ATM address server further comprising
      address registration completion notifying means for sending a registration completion notice of the address information to the end system and relay system, while the end system and relay system further comprising
  address information registration completing means for receiving the registration completion notice of the address information from the ATM address server and recognizing the address information registration completion.

5. A dynamic ATM address mapping system as set forth in claim 2, wherein
the end system and relay system further comprising
  address information refresh means for deleting address entry on a corresponding end system or relay system of a communication party from said own address correspondence table, at a predetermined elapsed time without communication after finishing the communication with the end system of the communication party.

6. A dynamic ATM address mapping system as set forth in claim 2, wherein
the end system and relay system further comprising
  address query means for requesting the ATM address server to refer to an ATM address of a communication party, when receiving no ATM address information of the communication party, while
the ATM address server further comprising
  address retrieval means for receiving the address query request from the end system and relay system and retrieving the corresponding ATM address from said own address correspondence table for a specified network address as a key.

7. A dynamic ATM address mapping system in an OSI communication environment via an ATM-SVC network, wherein
  an ATM address server for registering address information of pair of ATM address and network address on each end system and relay system of a logical sub-network into an address correspondence table and controlling the address information, is provided within the logical sub-network,
  the ATM address server comprising
    address registering means for registering the address information of the ATM address and network address in pair into the own address correspondence table, according to a registration request of the address information of pair of the own ATM address and network address from the end system and relay system,
    address retrieval means for retrieving the corresponding ATM address from said own address correspondence table for a specified network address as a key, according to the ATM address query request of a communication party from the end system and relay system, and
    address notifying means for notifying the ATM address obtained as a result of the retrieval to the end system and relay system.

8. A dynamic ATM address mapping system as set forth in claim 7, wherein
the ATM address server further comprising
  address registration completion notifying means for sending a registration completion notice of the address information to the end system and relay system.

9. A dynamic ATM address mapping method in an OSI communication environment via an ATM-SVC network, wherein
  an ATM address server for registering address information of each pair of ATM address and network address on each end system and relay system of a logical sub-network into an address correspondence table and controlling the address information, is provided within the logical sub-network,
said method comprising the steps of:
  in each of the end system and relay system within the logical sub-network,
  requesting the ATM address server to register the address information of the own ATM address and network address in pair; and
  receiving an ATM address of a communication party from the ATM address server and registering the ATM address into the address correspondence table; while
  in the ATM address server,
  registering the address information of the ATM address and network address in pair into the address correspondence table, upon receipt of the address information registration request from the end system and relay system; and
  receiving an ATM address of a communication party required by the end system and relay system from the address correspondence table and notifying the ATM address to the end system and relay system.

10. A dynamic ATM address mapping method as set forth in claim 9, comprising the step of:
  in the end system and relay system,
  deleting address entry on a corresponding end system or relay system of a communication party from the own address correspondence table, after finishing the communication with the end system of the communication party.

11. A dynamic ATM address mapping method as set forth in claim 9, comprising the step of:
  in the ATM address server,
  sending a registration completion notice of the address information to the end system and relay system; and
  in the end system and relay system,
  receiving the registration completion notice of the address information from the ATM address server and recognizing the address information registration completion.

12. A dynamic ATM address mapping method as set forth in claim 9, comprising the step of:
  in the end system and relay system,
  deleting address entry on a corresponding end system or relay system of a communication party from the own address correspondence table, at a predetermined elapsed time without communication after finishing the communication with the end system of the communication party.

13. A dynamic ATM address mapping method as set forth in claim 9, comprising the step of:
  in the end system and relay system,
  requesting the ATM address server to refer to an ATM address of a communication party, when receiving no ATM address information of the communication party; and
  in the ATM address server,
  receiving the address query request from the end system and relay system and retrieving a corresponding ATM address from the own address correspondence table for a specified network address as a key.

* * * * *